US011388165B2

(12) United States Patent
Epstein et al.

(10) Patent No.: US 11,388,165 B2
(45) Date of Patent: Jul. 12, 2022

(54) SYSTEMS AND METHODS FOR PREVENTING A FRAUDULENT REGISTRATION

(71) Applicant: Synamedia Limited, Staines Upon Thames (GB)

(72) Inventors: Steve Epstein, Hashmonaim (IL); Orly Ovadia-Amsalem, Jerusalem (IL)

(73) Assignee: SYNAMEDIA LIMITED, Staines Upon Thames (GB)

( * ) Notice: Subject to any disclaimer, the term of this patent is extended or adjusted under 35 U.S.C. 154(b) by 349 days.

(21) Appl. No.: 16/592,452

(22) Filed: Oct. 3, 2019

(65) Prior Publication Data

US 2021/0105277 A1    Apr. 8, 2021

(51) Int. Cl.
*H04L 9/40*  (2022.01)
*H04L 9/32*  (2006.01)
*G06F 16/9535*  (2019.01)
*G06F 16/9536*  (2019.01)

(52) U.S. Cl.
CPC ........ *H04L 63/101* (2013.01); *G06F 16/9535* (2019.01); *G06F 16/9536* (2019.01); *H04L 9/3231* (2013.01); *H04L 9/3234* (2013.01); *H04L 9/3271* (2013.01); *H04L 63/08* (2013.01); *H04L 63/1408* (2013.01)

(58) Field of Classification Search
CPC ... H04L 63/101; H04L 63/08; H04L 63/1408; H04L 9/3231; H04L 9/3234; H04L 9/3271; G06F 16/9535; G06F 16/9536
See application file for complete search history.

(56) References Cited

U.S. PATENT DOCUMENTS

| | | | | |
|---|---|---|---|---|
| 9,858,402 | B2 * | 1/2018 | Shen | H04L 9/32 |
| 10,701,067 | B1 * | 6/2020 | Ziraknejad | G06F 21/6209 |
| 2006/0048213 | A1 * | 3/2006 | Cheng | H04L 9/3271 |
| | | | | 726/5 |
| 2010/0263032 | A1 * | 10/2010 | Bhuyan | H04L 63/168 |
| | | | | 726/7 |
| 2012/0204243 | A1 * | 8/2012 | Wynn | H04L 63/1475 |
| | | | | 726/5 |

(Continued)

FOREIGN PATENT DOCUMENTS

| | | | | |
|---|---|---|---|---|
| RU | 2742910 C1 * | 2/2021 | | G06F 16/9554 |
| WO | WO-2013002903 A2 * | 1/2013 | | H04L 9/3231 |

*Primary Examiner* — Sarah Su
(74) *Attorney, Agent, or Firm* — Finnegan, Henderson, Farabow, Garrett & Dunner, LLP

(57) ABSTRACT

A method prompts a user to provide first credentials, receives the first credentials, and using an initial verification process including at least one of validity, a uniqueness, a suspicious contextual detection, or statistical recurrence verification, to verify the first credentials based on stored data. Based on a negative result of the initial verification process, the method prompts the user to provide second credentials, receives the second credentials, and validates the second credentials based on the stored data. The method registers the user for a service based on a positive result of the initial verification process or a positive result of the second strong validation process, refusing to register the user for the service based on a negative result of the initial verification process and the negative result of the second strong validation process, and blacklisting the verified second credentials upon registering the user.

22 Claims, 9 Drawing Sheets

(56) References Cited

U.S. PATENT DOCUMENTS

| | | | |
|---|---|---|---|
| 2013/0340048 A1* | 12/2013 | Sebastian | H04L 63/107 |
| | | | 726/4 |
| 2016/0180484 A1* | 6/2016 | Roebuck | G06Q 50/265 |
| | | | 705/31 |
| 2018/0176017 A1* | 6/2018 | Rodriguez | H04L 63/0861 |
| 2019/0075102 A1* | 3/2019 | Kim | H04L 9/3239 |
| 2019/0305955 A1* | 10/2019 | Verma | H04L 63/18 |
| 2020/0036788 A1* | 1/2020 | Zhang | H04L 63/08 |

* cited by examiner

FIG. 2C https://  205

Profile:

Name  Phone
Address  Occupation
Birthday  Employment
Social Media Accounts

Security Question
Security Answer

Financial Information

Number  Exp. Date  Security code
credit card
Address

210

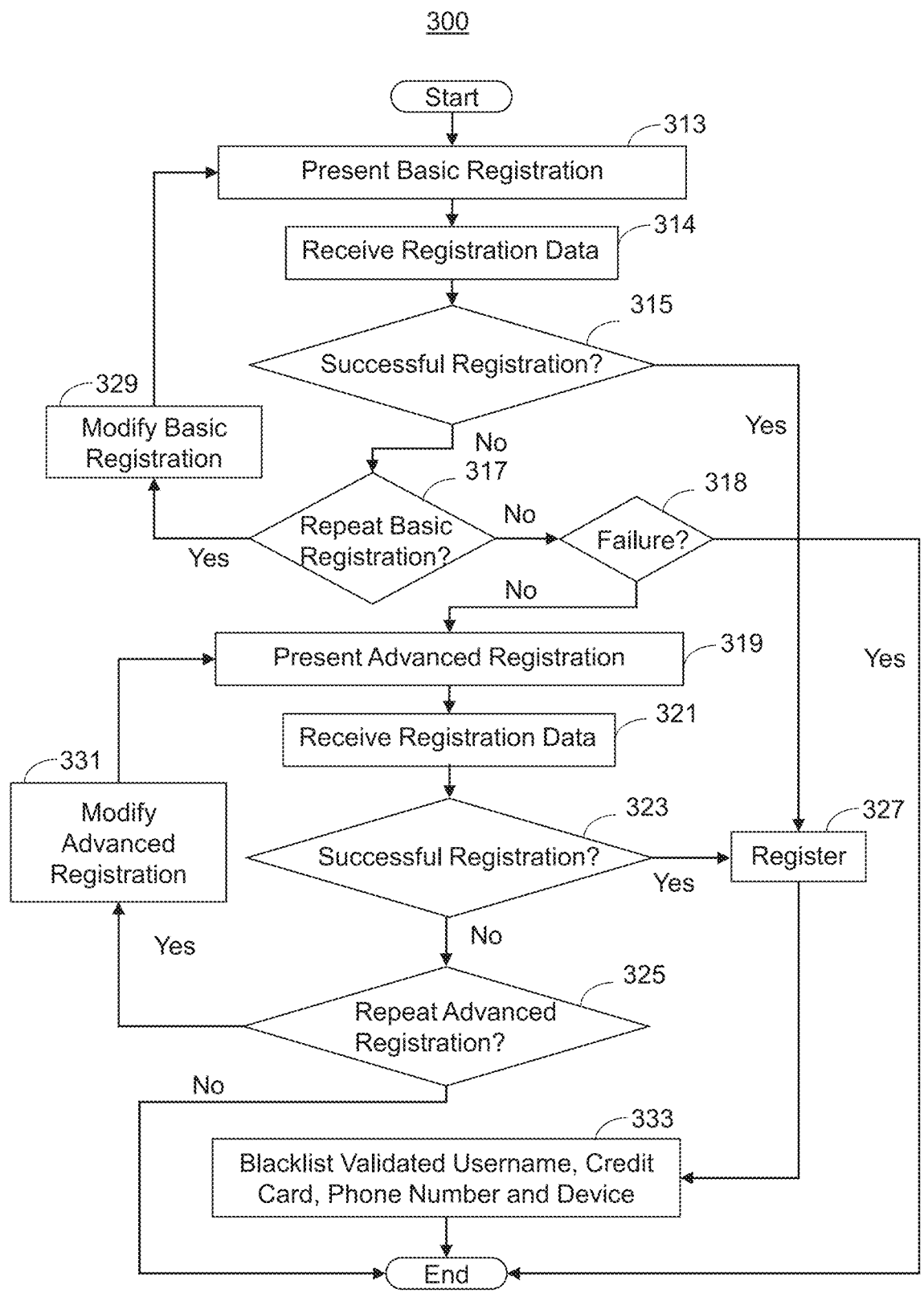

SYSTEMS AND METHODS FOR PREVENTING A FRAUDULENT REGISTRATION

TECHNICAL FIELD

The present disclosure relates to systems and methods for preventing a fraudulent registration, and more particularly, to systems and methods for analyzing registration data using statistical, rule-based and machine-learning methods to facilitate fraud management and to enhance registration security.

BACKGROUND

Every day, millions of individuals choose to engage in online transaction activities. Such transaction activities may include buying, selling, trading, and sharing of goods and services, experiencing media such as videos, games, music, pictures, and written material, and participating in interactive experiences such as blogging, posting, tweeting, and engaging in social networks. Some online services offer trial versions of applications, trial periods (i.e., periods during which access to the digital media content is free or is provided at a reduced rate) trial subscriptions, promotions, and gifts for a first-time user. However, various services, such as digital media content services, may be reluctant to offer trial periods to users due to a possibility of fraudulent registration for such periods. In general, a trial period may be used as a method of encouraging a user to experience the service at a low or no cost for a short period of time. Understandably, however, content service providers need to prevent consumers from re-registering for a new trial period after a previous trial period expires.

One of the methods for preventing re-registration (also referred to as fraudulent registration) is to obtain a unique device identifier (device ID) for a device of the consumer. These device IDs may be recorded in a database associated with the online service, and a device with the same device ID may not be allowed to re-register for the services. This approach restricts a consumer to be able to try the service only once for a given device. However, the recorded device ID may not be sufficient to deter a user from re-registering. For example, the user may find a different device, or, in some cases, modify the device ID.

The present invention provides a method to overcome this deficiency and other problems in the field by disclosing a comprehensive method for analyzing the credentials of a user to determine whether the user is entitled to a trial period for the service.

SUMMARY

Consistent with a disclosed embodiment, a user registration method includes prompting a user to provide a first set of credentials, receiving the first set of credentials, and using an initial verification process including at least one of validity, a uniqueness, a suspicious contextual detection, or statistical recurrence verification process, to verify the first set of credentials based on stored data. Further, the method includes, based on a negative result of the initial verification process, prompting the user to provide a second set of credentials, wherein the first and second sets of credentials are both associated with the user. The method also includes receiving the second set of credentials, and using a second strong validation process to validate the second set of credentials based on the stored data, registering the user for a service based on at least one of a positive result of the initial verification process or a positive result of the second strong validation process, refusing to register the user for the service based on at least a negative result of the initial verification process and the negative result of the second strong validation process, and blacklisting the verified second set of credentials upon registering the user.

Consistent with another disclosed embodiment, a system for registering a user via a primary device including a server is configured to execute instructions to perform operations. The operations include providing the user with an initial registration process, wherein the initial registration process requires the user to enter a first set of credentials, the first set of credentials including a username, evaluating statistical biometrics data of the user when the user is entering the first set of credentials during the initial registration process, and determining whether suspicious issues are present. The operations further include determining an initial qualification for registration based on verification of the first set of credentials based on a stored data, and an absence of the suspicious issues presented in the statistical biometrics data. The operations further include registering the user for a service based on a positive initial qualification, and providing the user with a second registration process, based on a negative initial qualification, wherein the second registration process includes operations comprising collecting information about the primary device, requesting the user to authorize a charge for a credit card, sending to a secondary device a secure token, requesting the user to enter the secure token via the primary device, and charging the credit card. The operations further include determining a second qualification by validating at least one of the credit card, the primary device information or secondary device information associated with the user, registering the user for the service based on a positive second qualification, refusing to register the user for the service based on a negative initial qualification and the negative second qualification, and blacklisting the validated data record upon registering the user.

Consistent with another disclosed embodiment, a user registration method includes prompting a user to provide a first set of credentials, receiving the first set of credentials, providing the user with an initial verification process, and using at least one of validity, unique replication, suspicious contextual detection, or statistical replication verification process to verify the first set of credentials based on stored data. The method further includes registering the user for a service, based on a positive result of the initial verification process, monitoring a user activity while performing the service for the user, monitoring one or more associated user devices used to facilitate the user activity, and suspending the service when the activity of the user is statistically similar to activities of previously registered users. When the service is suspended, the method includes prompting the user to provide a second set of credentials, wherein the first and second sets of credentials are both associated with the user, the second set of credentials has at least one credential that is different from every credential from the first set of credentials, the second set of credentials including at least one of a credit card number, a phone number, a username, or a device information associated with the user, receiving the second set of credentials, and using a second strong validation process to verify the second set of credentials based on the stored data. The method further includes resuming the service, based on a positive verification of the second set of credentials, and blacklisting any verified credentials from the first or the second set of credentials.

The foregoing general description and the following detailed description are exemplary and explanatory only and are not restrictive of the claims.

BRIEF DESCRIPTION OF THE DRAWINGS

The accompanying drawings are not necessarily to scale or exhaustive. Instead, the emphasis is generally placed upon illustrating the principles of the embodiments described herein. These drawings, which are incorporated in and constitute a part of this specification, illustrate several embodiments consistent with the disclosure, and, together with the detailed description, serve to explain the principles of the disclosure. In the drawings:

FIGS. 2A-2C are example interfaces for an initial registration process consistent with disclosed embodiments.

FIG. 3 is an example flowchart of a process for obtaining and evaluating user credentials for registering a user consistent with disclosed embodiments.

DETAILED DESCRIPTION

Figure 1:
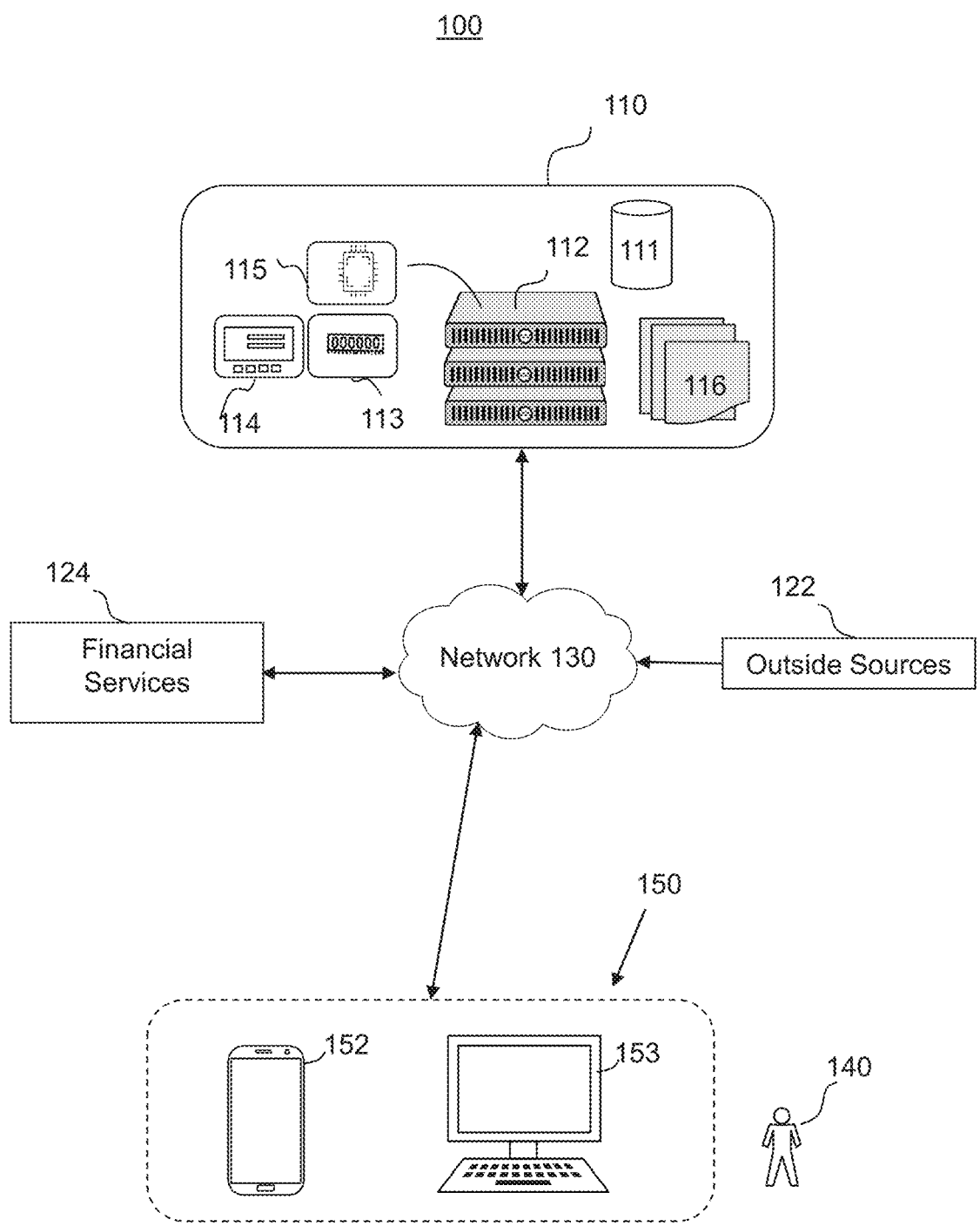
FIG. 1 is an example system for registering a user for service consistent with disclosed embodiments.

Reference will now be made in detail to example embodiments, discussed with regard to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

The disclosed embodiments relate to a user registration method for registering a user for a service, a program, a trial period, a trial subscription, an application, an e-commerce portal, and the like. The service may be, for example, a delivery service, access to a library, access to shopping discounts, access to a primary membership (e.g., primary membership at Amazon), access to a VIP service and the like. The method may include providing a user first with an initial registration process (also referred to as a first registration process), and if the initial registration process fails, providing the user with a second registration process. The initial registration process may be sufficiently simple (i.e., does not require the user to enter a lot of information) in order to encourage the user to register. Alternatively, in some cases, a significant amount of information may be requested by the server. In various embodiments, the requested information may not require validation. If the user fails to register during the initial registration process as described in detail below, the method may provide the user with a second registration process (also referred to as an advanced registration process). The second registration process may supplement the first registration process. The second registration process may include various information about the user that can be validated and possibly blacklisted (e.g., user's current and past addresses, user's telephone number, information about a credit card of the user, and the like), as well as requiring the user to perform actions (e.g., entering a secure token during the registration process, where the secure token is transmitted to the user via a secondary device), downloading software applications, answering security questions, and the like. The validation process during the second registration process may be referred to as an advanced validation process, the second verification process or the second strong validation process.

In various embodiments, a process of blacklisting user credentials may involve several steps performed, for example, by a server facilitating registration of the user. The server may receive the user credentials and validate the credentials to ensure that the credentials correspond to a user that is attempting to register with the service. For example, to validate a credential, such as a phone number of the user, the server may send a text message containing a token to a mobile phone of the user and require the user to enter the token during a registration process. After validating the credentials, the server may store information related to the user and user credentials in a database associated with the server. In addition, the server may store a data entry for a user-provided credential indicating the status of that credential. If the credential has been validated, the data entry for the credential may be "BLACKLISTED." The status of the credential being blacklisted is used to ensure that any attempt by the user (or possibly by another user) to use the same credential during a subsequent registration results in registration failure. In various embodiments, validated user credentials may be blacklisted upon successful registration of the user to ensure that any of these credentials may not be used again during subsequent registration attempts.

During the initial registration process, the method may include prompting a user to provide a first set of credentials. In some embodiments, the first set of credentials may be unique either to a user or a user device that is used for registering and/or for receiving the service. The unique credentials from the first set of credentials may include user-provided credentials (i.e., credentials that are voluntarily provided by the user), and collected credentials (i.e., credentials about the user that are collected during a registration process). For example, the first set of user-provided credentials may include user contact information such as user name, address, telephone number, twitter account, Facebook account, Skype account, email address, website address, address of a user blog, and the like. Other user-provided credentials may include initial financial credentials (e.g., credit card information), initial personal information (e.g., user date of birth, user height, user weight, user eye color), user telephone number, and user unique device information (e.g., MAC address of the device).

In various embodiments, a remote server (e.g., a cloud server) may execute operations for registering the user. For example, the server may display a registration form (e.g., such form may be a web-based application form containing input fields), receive the first set of credentials (e.g., receive credentials when the user submits the web-based application form), analyze credentials using an appropriate validation process, obtain user-related information from outside sources, store the obtained information and the received credentials in a database, and register the user. In an example embodiment, the server may use an initial verification process that may include at least one of validity, uniqueness, or statistical recurrence verification process to verify the first set of credentials based on stored data (e.g., the information about previously registered users, or information collected during previous unsuccessful attempts for a user to register), as further described below. In various embodiments, the first set of credentials may include rather simple registration information to encourage a user to register for a trial period of the service. In some cases, however, a sufficient amount of information may be requested by the server in order to determine the uniqueness of the user. In various embodiments, the requested information may not require validation.

The validity verification process may verify that the telephone number of the user corresponds to a smartphone, to a landline or to a virtual number (e.g., a number provided by a phone communication program such as Skype). In some cases, during the verification process, the server may collect the user IP address and obtain an approximate location of the user. The server then may compare the approximate location of the user with the address provided by the user. If the server determines that there is a discrepancy in the data provided by the user, the server may attempt to resolve the discrepancy by providing the user with additional questions (e.g., security questions). For example, the server may ask the user to authorize an inquiry of a geographic location of a secondary device of the user (e.g., a smartphone). Various other verifications may be used. For example, a zip code for an address may be evaluated to determine if it is consistent with other address-related details. In various embodiments, the server may determine if an address provided by the user exists. In some cases, when the telephone number is associated with the landline, the server may determine if the area code of the phone number corresponds to a zip code of the address provided by the user. In some cases, the server may obtain credit card information from the user, and verify that the name and address for the credit card correspond to the name and address provided by the user. If the validity verification process fails (e.g., if the credit card information is invalid), the server may prompt the user to try again before determining that the user does not pass the validity verification process. In an example embodiment, the server may ask the user several times to enter the correct information before determining that the validity verification process was not successful.

The uniqueness verification process is configured to ensure that the data from the first set of credentials do not match any previously entered data stored in the database. For example, to determine uniqueness, the server may determine that the address of the user entered during the registration process does not match the previously entered address. Similarly, the server may ensure that other credentials such as a user phone number, a user credit card number, a user email address, do not match previously entered credentials or do not match any related data entered in the database associated with the server. Thus, the server is configured to verify that information entered during the initial registration process is unique (i.e., not entered during prior registrations). If the uniqueness verification process fails (e.g., if the credit card information was previously blacklisted or used during prior registrations or registration attempts), the server may prompt the user to try again before determining that the user does not pass the uniqueness verification process. In an example embodiment, the server may ask the user several times to enter the correct information before determining that the uniqueness verification process was not successful. The verification process fails during the initial registration when blacklisted information is entered (e.g., blacklisted username, credit card, phone number, device identification, and the like).

The statistical recurrence verification process is configured to ensure that the information from the first set of credentials that may not be unique to a user participating in an initial registration process is not repeating at a high rate. For instance, nonunique parameters from the first set of credentials may be an IP address, a name of the user, a location of the user device used for registration (also referred to as a primary device), a location of a secondary device of the user (e.g., a smartphone), user biometrics (e.g., a fingerprint of a user, a voiceprint (i.e., a sample of a voice) of the user, a user employment information, a username, and a password of the user, details of hardware components of the primary or secondary device, and the like). In various embodiments, the user biometrics may be collected passively without the knowledge of the user. For example, a click speed (i.e., a speed at which the user clicks on a graphical user interface), a hand accuracy, a familiarity with various interfaces of the registration process, a user reading speed may be collected. In some embodiments, the user may be requested to sign the registration form, and user hand motion may be collected. For example, position and velocity of user fingers, or position and velocity of a device (e.g., a mouse, a stylus, and the like) used by the user to sign the registration form may be collected. In some cases, the user hand gestures (e.g., hand gestures that can be executed on a touch screen) may be collected as valuable behavioral biometrics. In some cases, the server may evaluate if the information provided by the user is similar to information that may be generated by a known identity generator. Additionally, or alternatively, the server may analyze contextual suspicious information (e.g., whether the user is registering on a first day of the month, whether a trial period has ended for a user with similar credentials, whether a registration for a user was attempted after a failed registration for another user with similar credentials (particularly when advanced registration was rejected, and the like). In various embodiments, the suspicious context may also be validated as described above.

If the server determines that a large number (e.g., more than seventy-five percent) of the nonunique parameters are repeating, the statistical recurrence verification process may fail. Similar to other verification processes, if the recurrence verification process fails, the server may prompt the user to try again before determining that the user does not pass the recurrence verification process.

In various embodiments, during the initial registration process, the server may calculate an initial suspicion score. The score may be evaluated using any suitable approaches. For example, for a piece of information, from the first set of credentials, that does not pass the validity verification the server may assign a first suspicion weight $s_1$; for a piece of information that does not pass the uniqueness verification, the server may assign a second suspicion weight $s_2$; for a piece of information that does not pass the statistical recurrence, the server may assign a third suspicion weight $s_3$, and for contextual suspicious information the server may assign a fourth suspicion weight $s_4$. Then the total score may be calculated as $S=\Sigma s_i$. In some cases, the initial suspicion score may be calculated using a machine-learning method, such as neural networks, recurrent neural networks, convolutional neural networks, semi-supervised or unsupervised techniques such as clustering, anomaly detection and the like. In an example embodiment, the machine-learning method may be trained using a supervised training. For example, the machine-learning method may receive authentic and fraudulent registration information and determine the initial suspicion score based on a back-propagation algorithm. In various embodiments, the initial suspicion score may represent a probability that the initial registration by the user is fraudulent (i.e., the user was previously registered for the services). In an example embodiment, if the initial suspicion score is above a predetermined threshold value (e.g., above seventy-five percent), the server may determine that the initial registration process, is not successful. In various embodiments, the unsupervised and semi-supervised learning techniques may be used as there may not be the availability of information related to who the real trial abusers may be.

If the initial registration process fails, the server may provide the user with a second registration process. During the second registration process, the server may prompt the user to provide a second set of credentials, wherein the first and second sets of credentials are both associated with the user and the second set of credentials may include credentials that may be different (or the same) as credentials from the first set of credentials. In various embodiments, the second set of credentials may include information about the user that can be validated and possibly blacklisted. For example, the second set of credentials may include previous addresses of the user, a user identification (e.g., a driver's number of the user) a passport number, and social media-related information, and the like. For example, the user may be required to provide the social media-related information and accept an invitation for friendship. For instance, the user may be required to login into a website associated with the social media and accept and invitation for the friendship from an avatar representing the registration process. Additionally, the user may be required to share a blog, a post, an image, etc. with the avatar.

In an example embodiment, the second set of credentials may not only include information entered by the user but may include actions requested from the user. For example, the server may request a mobile telephone number of the user, and send a text message containing a token or a text code. The server may require the user to enter the token to verify that the mobile telephone number is associated with the user. Additionally, or alternatively, the server may request the user to install a software application either on a primary device (i.e., the device that is used for registering the user) or on a secondary device (e.g., a smartphone of the user), or on both devices. In an example embodiment, during the second strong validation process, the server may ask the user to authorize the collecting of the information about the primary device used for the registration, and then, collect the device information. For example, the server may collect the device information via the installed software application (e.g., a browser plugin). For instance, the user may be registering using the primary/secondary device via a web browser, and the installed browser plugin may collect the information about the primary/secondary device. The information collected may include a MAC address of the primary/secondary device, Digital Rights Management (DRM) device identification, fonts, images, languages used for the primary/secondary device, settings for the primary/secondary device, parameters related to hardware of the primary/secondary device such as processor information, motherboard information, computer memory information, information about the graphics card, distribution of files over directories and/or drives, size of drives, information about operational system, BIOS-related information, information about system updates, or any other suitable information that may uniquely identify the user device, and which may not be easily altered by the user. For example, it may not be easy for the user to change information about the graphics card or the motherboard of the primary/secondary device. Additionally, or alternatively, a credit card of the user may be billed a nominal fee to validate the credit card number (i.e., to ensure that the credit card number is real and owned by the owner)

In some embodiments, during the initial verification process or during the second strong validation process, the user may be requested to share information related to a social media account for the user. For example, the user may share the public posts from the social media account. The server may be configured (either during the initial verification process or during the second verification process) to analyze a timeline of the posts of the user to determine that the social media account has been started sufficiently long ago (e.g., longer than a week ago or longer than one month ago). In some embodiments, the server may be configured to send a friend request to a user for a chosen social media account (e.g., the server may have a Facebook page associated with an account of the server, and may send a friend request to a Facebook account of the user). Upon the user receiving a friend request from the server's Facebook account, the user may add the server account to a list of friends of the user and allow sharing at least some of the information with the server account. For example, the user may allow the server to analyze some of the posts of the user and determine when the social media account was used by the user, how often the user posts to the social media account, and the like. In various embodiments, the social media account may include a Twitter account, a Facebook account, a Google account, a YouTube account, a Vimeo account, a LinkedIn account, a VK account, a WeChat account, a Sina Weibo account, and the like.

In some cases, during the initial or second registration process, the server may be configured to collect biometric information from the user. In some cases, the biometric information may not be collected during the second registration process. For example, the server may be configured to analyze the typing patterns of the user entering information into an initial or a second registration form, analyze whether user pastes or types information and what kind of information is being typed by the user and what kind of information is being pasted. Further, the server may evaluate click speed (e.g., how quickly the user clicks on various graphical elements available during the initial or second registration process). For devices supporting hand gestures (e.g., touch screens), the collected biometric information may include user gestures. In some embodiments, the server may be configured to receive audio from the user (e.g., the server may request the user to answer some of the questions, provided during the registration process by speaking the answers). In some cases, the user is requested to use a software application provided by the server to capture one or more images or a video of the user.

In some embodiments, the server may require the user to install a software application on the secondary device (e.g., a smartphone) to collect information about the user. For example, the installed software application may collect voice data from the user, video/image data from the user, and a fingerprint of the user.

In some cases, the user may be required to provide personal information (e.g., a height of the user, weight of the user, a color of user's hair, color of user's eyes, age of the user, and the like). In an example embodiment, the server may confirm some of the provided information by analyzing the images/video provided by the user.

In various embodiments, after receiving the second set of credentials, the server may use a second verification process to verify the second set of credentials based on the stored data. Similar to the initial verification process, the second verification process may also include validity verification, uniqueness, and statistical recurrence verification process. For example, the validity verification process may be used to verify that the second set of credentials contains only valid data such as valid addresses, a valid user identification numbers (e.g., a driver's license number, a social security number, a bank account number, a credit card number, a passport number, and the like), a valid IP address, a valid location for the user, a valid social media account, and the like).

The uniqueness verification process for the second registration may include verifying whether information related to the primary device or the secondary device was previously used. In some cases, the server may be configured to determine when previous information that matches information from the second set of credentials was received by the server, and whether a user, for whom the previous information was collected, is registered with the service provided by the server. For example, if the previous information was entered recently (e.g., a minute ago, a few minutes ago, tens of minutes ago, an hour ago, a day ago, or a week ago), and an attempt to register a user (when the user entered the previous information) has failed, the server may conclude that the user that provides the second set of credentials may be attempting to re-register for the services. In some cases, when a trial period for a user, for whom the previous information was collected, is lapsed, the server may conclude that the user that provides the second set of credentials, may be attempting to re-register for the services. The steps for uniqueness verifications described above are only illustrative, and various other steps may be used.

The statistical recurrence verification process for the second registration may be similar to the statistical recurrence verification process for the initial registration. For example, the statistical recurrence verification process may be configured to ensure that the information from the second set of credentials, which may not be unique to a user participating in the second registration process, is not repeating at a high rate. For instance, nonunique parameters from the second set of credentials may be a voiceprint for the user, an image of the user, statistics collected from the primary device of the user (e.g., a hard disk usage for the primary device, a type of OS of the primary device, information from social media, information from user blogs, and the like). If the server determines that a large number (e.g., more than seventy-five percent) of the nonunique parameters are repeating, the statistical recurrence verification process may fail. Similar to other verification processes, if the recurrence verification process fails, the server may prompt the user to try again before determining that the user does not pass the recurrence verification process.

In one embodiment, during the advanced registration process, only credentials that may be validated may be collected. The advanced registration process may be used to blacklist the validated credentials. In such case, not non-unique credentials or statistically recurrent credentials may not be collected, as opposed to a process of the initial registration where non-unique and statistical recurrent credentials are collected to analyze contextual suspicious information and calculate the initial suspicion score, as described above. For example, during the advanced registration process, credentials that may be validated may include a username, a credit card number, a phone number, device unique identification (e.g., device MAC address), email address, driver's license, passport number, social security number, and the like.

In an example embodiment, during the second verification, the server may request the user to provide a reference user, that, for example, is a registered user. The server may be configured to send a verification to the reference user and receive the confirmation from the reference user. The reference user may be an individual with an established reputation (e.g., the reference user may be using the services provided by the server for an extended period of time, such as for several months, a year, or several years).

In another embodiment, during the second verification, the server may collect information about the user via an outside source such as Internet, user-related blogs, user social media (e.g., LinkedIn, and the like), various posts or comments by the user, social media links to the user, user videos, videos/images/articles shared by the user, yellow/white pages, financial data (e.g., credit card data, credit score, etc.), or information obtained by running a background check for the user. After collecting the information, the server may be configured to formulate a security question for the user, ask the user the question, and determine the authenticity of the user. For example, if a user is attempting to re-register with the services using his/her friend's name and friend's related information, the server may be configured to ask the user where was the user during the month of July of last year. The server may determine the authenticity of the user depending on the correctness and, in some cases, on how quickly the user provides an answer to the question asked by the server.

In various embodiments, during the second registration process, the server may calculate a second suspicion score. The second suspicion score may be evaluated using an approach that is similar to the one used for calculating the initial suspicion score. In some cases, the initial and the second suspicion score may be combined to yield a total suspicion score. If the total suspicion score is above a predetermined threshold value (e.g., above ninety-five percent), the server may determine that the initial registration process and the second registration process has failed.

In various embodiments, if the user has successfully registered for a service, the information related to an account of the user, that can be validated, may be blacklisted. The information that cannot be validated may not be blacklisted to prevent one person from blacklisting information of another person. In various embodiments, a primary and a secondary device of the user may be blacklisted if these devices are validated. Additionally, the server may blacklist a credit card, a phone number, and a username of the user once the user successfully registers for a trial period of the service.

FIG. 1 shows an example of a system 100 for registering a user 140 and user devices 150 such as a primary device 153 and a secondary device 152. In an example embodiment, primary device 153 may be a desktop, a laptop, a gaming console, a television (TV), a smart TV, a workstation, a data center, and the like, and secondary device 152 may be a smartphone, a tablet, a TV, a laptop, and the like. The system may include a server 110 for executing various operations related to registering a user 140, registering user devices 150, as well as analyzing various credentials provided by user 140. Additionally, server 110 may provide services 116 (e.g., provide user 140 with a portal, a library subscription, an e-commerce website, a web-based application, a stand-alone application, and the like) to user 140 once user 140 is registered to receive services 116. FIG. 1 shows that server 110 may include a database 111 and a computing system 112. The computer system may include one or more processors 115, a memory 113 for storing instructions and an interface 114 for modifying various parameters and instructions for server 110. In various embodiments, database 111 is used for storing information related to various users registered for services 116. Additionally, database 111 may store information associated with previous unsuccessful registration attempts of various users. Furthermore, database 111 may store information that is blacklisted. For instance, database 111 may store a data record related to a blacklisted username for a user that is not authorized to use services 116, a blacklisted address, a blacklisted passport number, a blacklisted driver's number, a blacklisted social security number of the user, and the like. During a new registration of a new user (e.g., user 140), if user 140 enters any information that is blacklisted (e.g., user 140 enters a phone number that is blacklisted), server 110 may be configured to fail registering user 140. In some cases, server 110 may be configured to provide user 140 with several attempts at entering user credentials (e.g., the first set of credentials or the second set of credentials) before rejecting the registration user 140. Server 110 may communicate with user devices 150 via a network 130.

Network 130 may be any type of network that provides communications, exchanges information, and/or facilitates the exchange of information between server 110 and user devices 150. For example, the network 130 may be the Internet, a Local Area Network, a cellular network, a public switched telephone network ("PSTN"), or other suitable connection(s) that enables server 110 to send information to and receive information from user devices 150. Network 130 may support a variety of electronic messaging formats and may further support a variety of services 116.

Server 110 may be connected to outside sources of information 122 via network 130. The outside sources, as described above, may include Internet webpages, social media posts, blogs, photographs, images, video, and the like. In some cases, server 110 may search for information in outside sources 122 to determine information about user 140 (e.g., personal information about user 140, contact information about user 140, and the like). Additionally, or alternatively, server 110 may be connected to financial services 124 corresponding to various financial accounts of user 140 in order to receive financial information related to user 140. For instance, in some embodiments, user 140 may authorize server 110 to access information of financial services 124 and determine the authenticity of user 140 based on the financial information. For example, user 140 may provide server 110 with credit card information, and server 110 may be configured to contact financial services 124 to verify that the credit card information corresponds to user 140. Alternatively, user 140 may provide server 110 with any other verifiable financial information including bank account information, loan information, wages for user 140, real estate taxes for user 140, and the like.

Figure 2A:
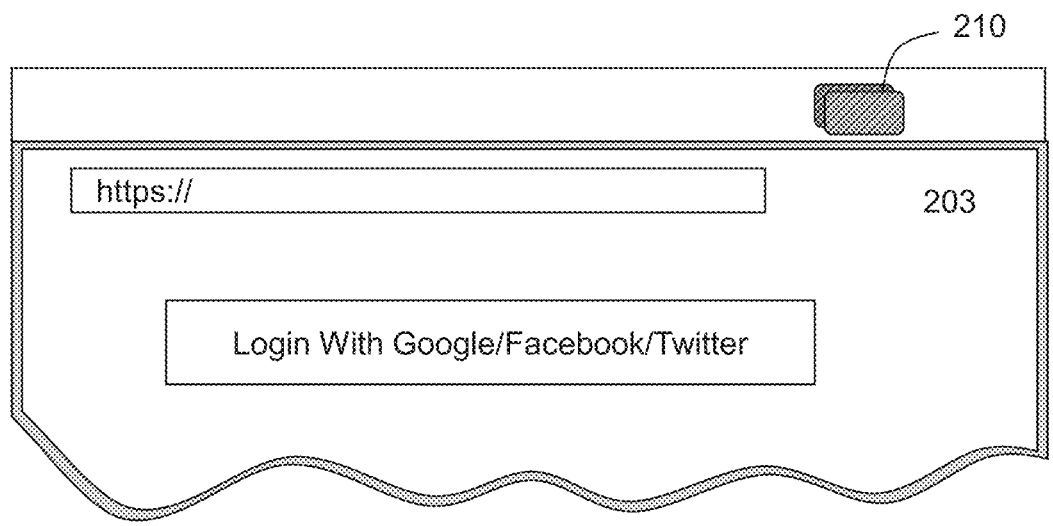
Figure 2B:
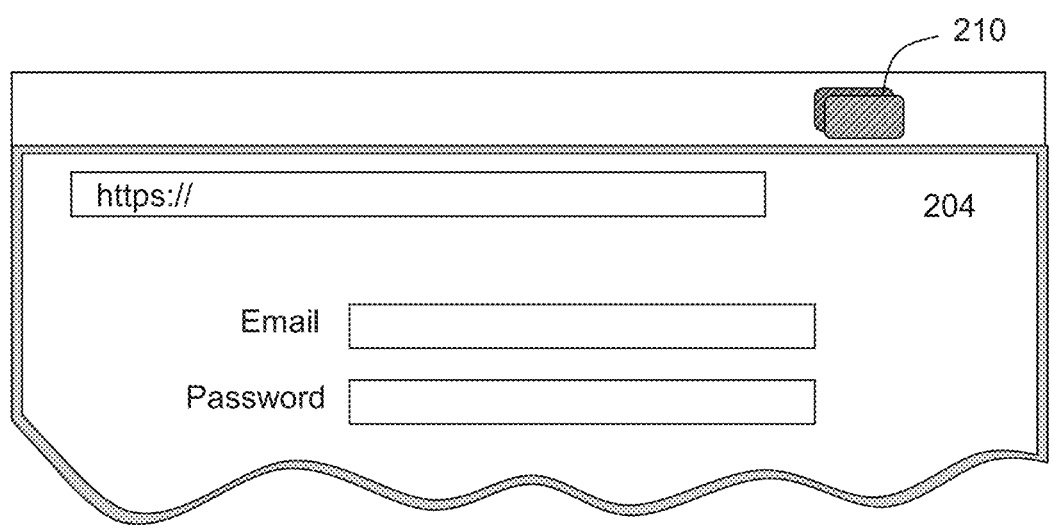

FIGS. 2A and 2B show examples of the first steps of a simple registration form for an initial registration process. The registration form may be a webpage 203, as shown in FIG. 2A or a webpage 204, as shown in FIG. 2B. In an example embodiment, shown in FIG. 2A, the form may allow user 140 to register using one of the social media accounts such as a Google account, a Facebook account, a Twitter account, and the like. Alternatively, webpage 204, as shown in FIG. 2B, allows user 140 to register using an email account of user 140 and a password selected by user 140. After completing the registration form shown in FIG. 2A, or FIG. 2B, user 140 may be directed to a second-level webpage 205, as shown in FIG. 2C. Webpage 205 may ask user 140 to enter profile information including the first set of credentials (e.g., a user name, an address, a birthday, a phone, an occupation, and employment of user 140, etc.) as described above. Server 110 may be configured to require user 140 to fill out the profile information to provide services 116 to user 140. For example, an e-commerce portal may provide an assortment of products for user 140, but requires user 140 to enter at least financial and address information in order to facilitate purchases of the products by user 140. In addition to the profile information, webpage 205 may request a user to enter information about one or more social media accounts, to choose a security question and a related security answer, and enter financial information, that may include, for example, a credit card related information (e.g., a number, an expiration date, and a security code of the credit card) and/or bank account number. In some cases, as described above, server 110 may require user 140 to download and install a browser plugin 210, as shown in FIGS. 2A-2C. The browser plugin may be configured to collect information related to a primary device of user 140 (e.g., MAC address of the device, hardware information of the primary device, and the like) as previously described.

FIG. 3 shows an example process 300 for registering user 140 consistent with disclosed embodiments. At step 313 of process 300, user 140 is presented with an initial registration form, which may include multiple webpages (e.g., webpages 203, 204 and 205). In various embodiments, as described before, during the initial registration, a first set of credentials may be received by server 110 at step 314. In addition, at step 314, server 110 may collect user-related information, for example, from outside sources 122, as shown in FIG. 1 or from financial services 124, as shown in FIG. 1. During the initial registration, at step 315, server 110 may use the validity verification process, uniqueness verification process, or statistical recurrence verification step as described above to determine if user 140 can be successfully registered. If user 140 can be successfully registered (step 315, Yes), process 300 may proceed to step 327 and register user 140. However, if user 140 cannot be successfully registered (step 315, No) due to, for example, errors in a zip code, process 300 may proceed to step 317 at which server 110 may determine if initial registration needs to be repeated. After completion of step 327, process 300 may proceed to step 333 at which a validate information may be blacklisted. For example, at step 333, a phone number, a username, a credit card number, or device-related information may be blacklisted.

The decision to repeat the initial registration steps may be based on multiple factors. For example, if user made a typo or unintentional mistake (e.g., mistyped an area code of the phone number, made a mistake in a zip code, incorrectly typed the name of the street, made an error in a credit card number, and the like), the initial registration step may be repeated. Server 110 may determine that mistake is unintentional if server 110 does not observe patterns of deception in data related to the first set of credentials. A pattern of deception may relate, for example, to a disagreement between an address entered by user 140 and an estimation of the address obtained from an IP address of the primary device of user 140.

Some of the patterns of deception may be rule-based algorithms (e.g., an algorithm that checks if an area code of a phone number corresponding to a landline corresponds to the area code for the address provided by user 140), while some of the patterns of deception may be recognized using machine-learning methods (e.g., supervised or semi-supervised methods) such as neural networks, recurrent neural networks, convolutional neural networks, clustering algorithms for anomaly detection, logistic regression, decision trees, and models based on ensemble methods, such as random forests. In some embodiments, multiple machine learning models (e.g., multiple neural network systems) capable of interacting with one another may be used. The machine-learning models may have parameters that may be selected for optimizing the performance of the machine-learning model, such as parameters specific to the particular type of model. For example, the number of features and the number of layers in a neural network may be optimized to improve the model's performance. In an example embodiment, a machine-learning network may be trained to recognize a pattern of deception by providing the machine-learning network with good registration data and registration data that includes some fraudulent and/or inconsistent information.

In various embodiments, at step 317 of process 300, the decision whether or not to allow user 140 to repeat initial registration may be based simply on a number of times user 140 attempted the initial registration. For example, server 110 may allow user 140 to attempt initial registration for several times (e.g., for two times, for three times, and the like) before determining that user 140 could not successfully register during the initial registration. If server 110 determines that user 140 is allowed to repeat the initial registration (step 317, Yes), process 300 may proceed to step 329 where some parameters of the initial registration may be adjusted. For example, during a second attempt at completing the initial registration, server 110 may ask user 140 additional questions to determine if the registration includes fraudulent data. For example, server 110 may ask a user to provide a credit card number to determine if the name and address provided by user 140 correspond to the name and address associated with the credit card. In some cases, the server may use a checksum algorithm like modulus 10 to validate a credit card number. In some cases, at step 329, no modification of the initial registration process may be needed. In some cases, if server 110 suspects patterns of deception in data related to the first set of credentials, server 110 may request clarification for data related to a possible pattern of deception. For example, server 110 may ask user 140 to verify the entered address or a phone number. After completion of step 329, process 300 may proceed to step 313. If, however, server 110 determines that user 140 is not allowed to repeat the initial registration (step 317, No), process 300 may proceed to 318 and determine if initial registration has failed. In various embodiments, the initial registration may fail if at least one of the entered credentials is blacklisted. If the at least one of the entered credentials is blacklisted (step 318, Yes) the registration is determined to be invalid and process 300 may be terminated. Alternatively, if there are no entered credentials that are blacklisted (step 318, No), process 300 may proceed to step 319 and present user 140 with the second registration as described above. At step 321, during the second registration, a second set of credentials may be received by server 110. In addition, at step 321, server 110 may collect user-related information, for example, from outside sources 122, as shown in FIG. 1 or from financial services 124, as shown in FIG. 1.

At step 323, server 110 may use the second verification process, as described above, to determine if user 140 can be successfully registered. If user 140 can be successfully registered (step 323, Yes), process 300 may proceed to step 327 and register user 140. However, if user 140 cannot be successfully registered (step 323, No), due to, for example, inconsistencies in the provided data corresponding to the second set of credentials, process 300 may proceed to step 325 at which server 110 may determine if advance registration needs to be repeated.

The decision to repeat the advance registration process steps may be similar to the decision to repeat the initial registration process steps. For example, if the user made a typo or unintentional mistake, the second registration step may be repeated. Alternatively, if server 110 observes patterns of deception in data related to the second set of credentials, server 110 may determine that the second registration should not be repeated. Similar to the process of the initial registration, at step 325 of process 300, the decision whether or not to allow user 140 to repeat the second registration may be based simply on a number of times user 140 attempted the second registration. For example, server 110 may allow user 140 to attempt the second registration for several times (e.g., for two times, for three times, and the like) before determining that user 140 has failed the second registration. If server 110 determines that user 140 is allowed to repeat the second registration (step 325, Yes), process 300 may proceed to step 331 where some of the parameters of the second registration may be modified. For example, during a second attempt at completing the second registration, server 110 may ask user 140 additional questions to determine if the registration includes fraudulent data. For example, server 110 may ask a user to provide a phone number for the secondary device, receive a token via a text message to the secondary device, and enter the token during the registration process. It should be noted that any other suitable modification of the second registration may be possible. In some cases, at step 331, no modification of the second registration process may be needed. In some cases, if server 110 suspects patterns of deception in data related to the second set of credentials, server 110 may request clarification to data related to a possible pattern of deception. For example, server 110 may ask user 140 to verify the entered credit card number or provide server 110 with information related to a social media account. If server 110 determines that user 140 is not allowed to repeat the second registration (step 325, No), process 300 may proceed to step 333 and blacklist information validated during the basic or advanced registration.

In one embodiment, repeat advanced registration may not be allowed, and steps 325 and 331 may not be present in process 300. For example, during the advanced registration if credentials entered by the user or collected using an appropriate software application (e.g., a browser plugin) are blacklisted, invalid, and the like, the advanced registration may be unsuccessful.

In various embodiments, at step 333, server 110 may blacklist user information that has been validated. This ensures that the user cannot blacklist information related to other people, such as a phone number or an address of another person, and the like. For example, server 110 may validate that a device of the user, a phone number of the user, the credit card of the user, an address of the user, a username, and the like, and then blacklist the validated information. While some of the validation may be done during the initial registration, in general, most of the validation is done during the second registration. For example, during the second registration, server 110 may validate that a phone number provided by the user corresponds to the mobile phone of the user by sending a token via a text message to the mobile phone and requesting the user to enter the token via an interface for the second registration.

Figure 4:
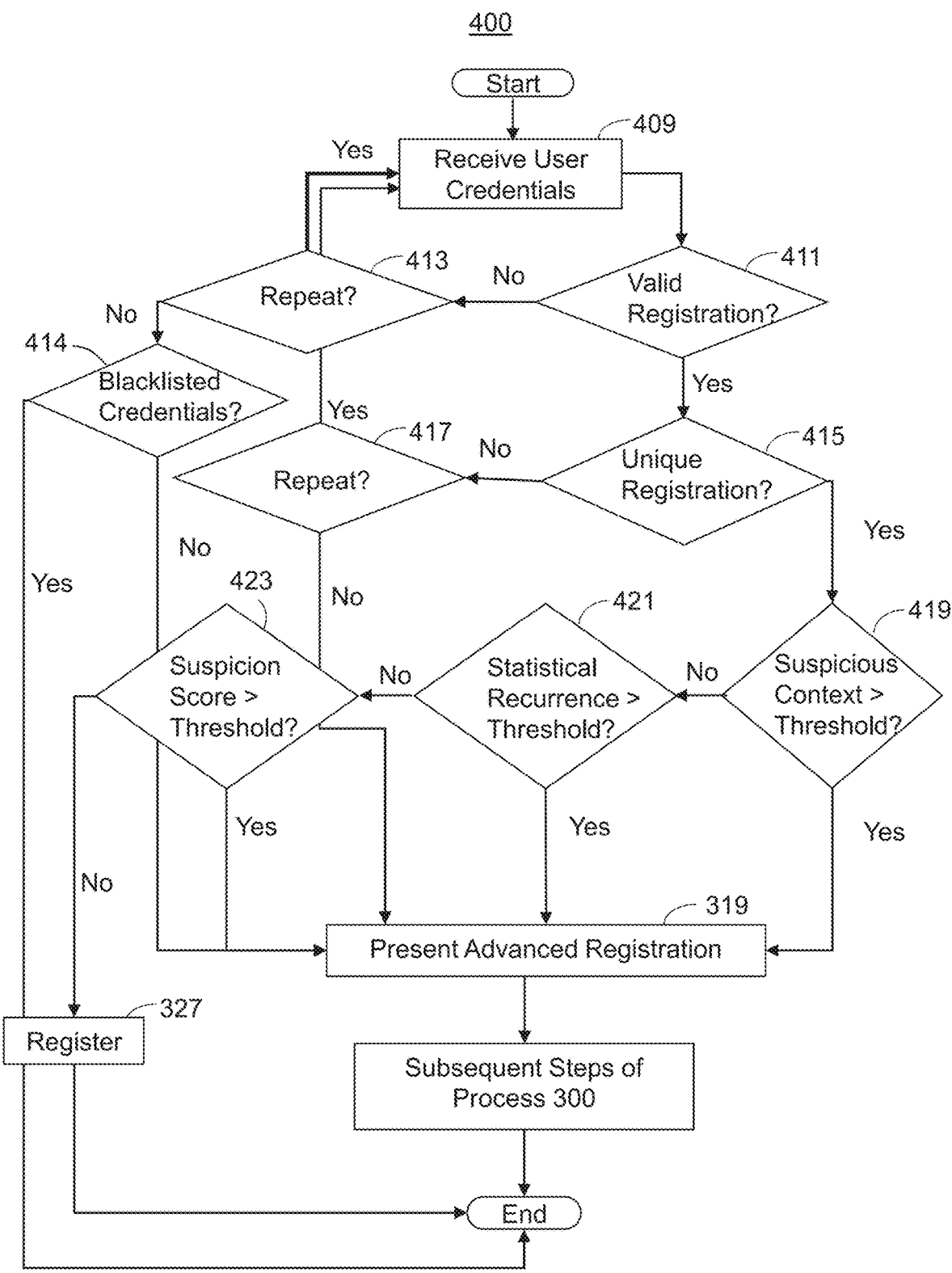
FIG. 4 is an example flowchart of a process for verifying user credentials using an initial verification process consistent with disclosed embodiments.

FIG. 4 shows a process 400 of the initial registration. At step 409 of process 400, server 110 is configured to receive user credentials (e.g., the first set of the user credentials, as described above). At step 411, the initial verification process may check if the registration credentials are valid using any suitable approaches described above (e.g., checking the address validity by comparing the address provided by user 140 with an address obtained from the user's IP address, and the like, comparing a name provided by user 140 with a name associated with the credit card, verifying that the address is consistent with a provided zip code and/or area code of the phone number, verifying the existence of the credit card number using, for example, Luhn checksum algorithm, and the like).

If the registration is invalid (step 411, No), process 400 may proceed to step 413 and determine if new (e.g., corrected) credentials need to be supplied by user 140. The determination of whether to provide user 140 with another attempt at providing corrected credentials may be based on multiple factors and may be similar to at least some of the decision conditions for step 317 as described in connection with FIG. 3. For example, if user 140 made an unintentional mistake (e.g., server 110 does not observe any patterns of deception in data related to the first set of credentials), step 409 may be repeated. At step 413, server 110 may determine if step 409 needs to be repeated. If step 409 is determined to be repeated and new credentials need to be supplied by user 140 (step 413, Yes), process 400 proceeds to step 409. Alternatively, if the initial registration is not successful (step 413, No), process 400 may proceed to step 414 of process 400. At step 414, server 110 may determine if at least one of the entered credentials is blacklisted. If the at least one of the entered credentials is blacklisted (step 414, Yes) the registration is determined to be invalid and process 400 may be terminated. Alternatively, if there are no entered credentials that are blacklisted (step 414, No), process 400 may proceed to step 319 of the second registration process as described in related step 319 of process 300 depicted in FIG. 3.

If the registration is valid (step 411, Yes), process 400 may proceed to step 415 and determine if data from the first set of the credentials are unique (e.g., the data from the first set of credentials do not match any previously entered data stored in database 111, as shown in FIG. 1). Approaches for determining uniqueness may include any suitable approach as described above in connection with the uniqueness verification process. For instance, if an address entered by user 140 matches a previously entered address, server 110 may determine that the registration is not unique. If registration is not unique (step 415, No) process 400 may proceed to step 417 that determines whether step 409 needs to be repeated. Such determination may be based on at least some of the decision conditions for step 317 as described in connection with FIG. 3. For example, if user 140 made an unintentional mistake (e.g., server 110 does not observe any patterns of deception in data related to the first set of credentials), step 409 may be repeated. If server 110 determines that step 409 needs to be repeated (step 417, Yes), process 400 proceeds to step 409. Alternatively, if the unique registration is not successful (step 415, No) and no new credentials need to be supplied (step 417, No), process 400 may proceed to step 319 of the second registration process. In some cases, unique registration may not be repeated upon failure of the unique registration, and if the unique registration is not successful (step 415, No) process 400 may proceed to step 319 of the second registration process. Thus, in some cases, (step 417, Yes) may not be present in process 400.

At step 419, server 110 may determine whether the data from the first set of credentials includes a suspicious context. For example, as described above, server 110 may determine that the data includes a suspicious context if one or more suspicious issues are identified. The suspicious issue may be identified if user 140 is registering on a first day of the month, whether a trial period has ended for a user with similar credentials, whether a registration for a user was attempted after a failed registration for another user with similar credentials (particularly when advanced registration was rejected). Additionally, the suspicious issue may be determined when a similar IP address, device information, a password, a username, a name of the user, behavioral biometrics (e.g., a click speed, an accuracy of a click, a familiarity with various interfaces of the registration process, a reading speed, etc.), and the like were used for previous registrations.

In some cases, suspicious issues are identified if there is a correlation among some of the credentials entered by the user during a registration attempt and parameters (e.g., biometrics) related to the registration attempt, and credentials and parameters recorded for previous registrations and/or previous registration attempts. For example, if IP address of the user device entered during a registration attempt matches the previously entered IP address for a previous registration (or previous registration attempt), and biometrics of the user match previously determined biometrics corresponding to the same previous registration (or the same previous registration attempt) the suspicious issues may be identified. In some cases, if the previous registration attempt is failed and subsequent registration matches biometrics of the previous registration attempt, the suspicious issues may be identified. In some cases, time between a failed registration attempt and a new registration attempt may be used as a parameter for identifying suspicious issues. For example, if a new registration attempt follows closely a failed registration attempt and location of the new registration attempt is the same (or approximately the same) as the location of the previous registration attempt, the suspicious issues may be identified. In some cases, if a trial period for a user at a location is expired and new registration is detected for the same location, the suspicious issues may be identified. In some cases, if a trial period for a user that has distinct biometrics is expired and a new registration is detected for similar biometrics, the suspicious issues may be identified.

In various embodiments, the suspicious context may be measured using an appropriate score. For example, the suspicious context may be measured by evaluating the number of suspicious issues and the correlation between the suspicious issues. In an example embodiment, the measure of the suspicious context may be suspicion weight $s_4$, as described above. If suspicion weight $s_4$ is above the threshold value (step 419, Yes) process 400 may proceed to step 319 of the second registration process. Alternatively, if server 110 determines that the suspicion weight is below the threshold value (step 419, No) process 400 may proceed to step 421.

At step 421, server 110 may determine whether the data from the first set of credentials include a large amount of recurrent data. If, for example, more than fifty percent, sixty percent, seventy percent, seventy-five percent, eighty percent, or ninety percent of entered nonunique credentials (e.g., an IP address, a name of user 140, a location of the primary device, a location of the secondary device, and the like) are recurrent (i.e., the entered credentials match previously entered credentials for one or more previous registrations or previous registration attempts), server 110 may determine that the initial registration is not successful (step 421, Yes). In various embodiments, the percentage of nonunique credentials may be associated with suspicion weight $s_3$, as described above. For example, suspicion weight $s_3=0.7$, may indicate that seventy percent of entered credentials are nonunique. If suspicious weight $s_3$ is greater than a threshold value (e.g., greater than seventy-five percent, or any other suitable threshold), the initial registration may be determined as not successful (step 421, Yes). For such a case, process 400 may proceed to step 319. Alternatively, if the credentials entered by user 140 are not recurrent (step 421, No), process 400 may proceed to step 423.

At step 423, server 110 may calculate a suspicion score. The suspicion score may be calculated by summing the suspicion weights $S=s_1+s_2+s_3+s_4$, as described above. Alternatively, the suspicion score may be calculated using a machine-learning method, such as neural networks, recurrent neural networks, convolutional neural networks, semi-supervised or un-supervised techniques such as clustering, anomaly detection and the like. In various embodiments, the initial suspicion score may represent a probability that the initial registration by the user is fraudulent (i.e., the user was previously registered for the services). In an example embodiment, if the initial suspicion score is above a predetermined threshold value (e.g., above seventy-five percent, eighty percent, eighty-five percent, ninety percent, ninety-five percent, and the like), the server may determine that the initial registration process, was not successful (step 423, Yes). For such a case, process 400 may proceed to step 319. Alternatively, if the suspicion score is above the threshold value (step 423, No), process 400 may proceed to step 327 and register the user. FIG. 4 shows that after completion of step 319 subsequent steps of process 300 may be followed, as shown in FIG. 3.

Figure 5:
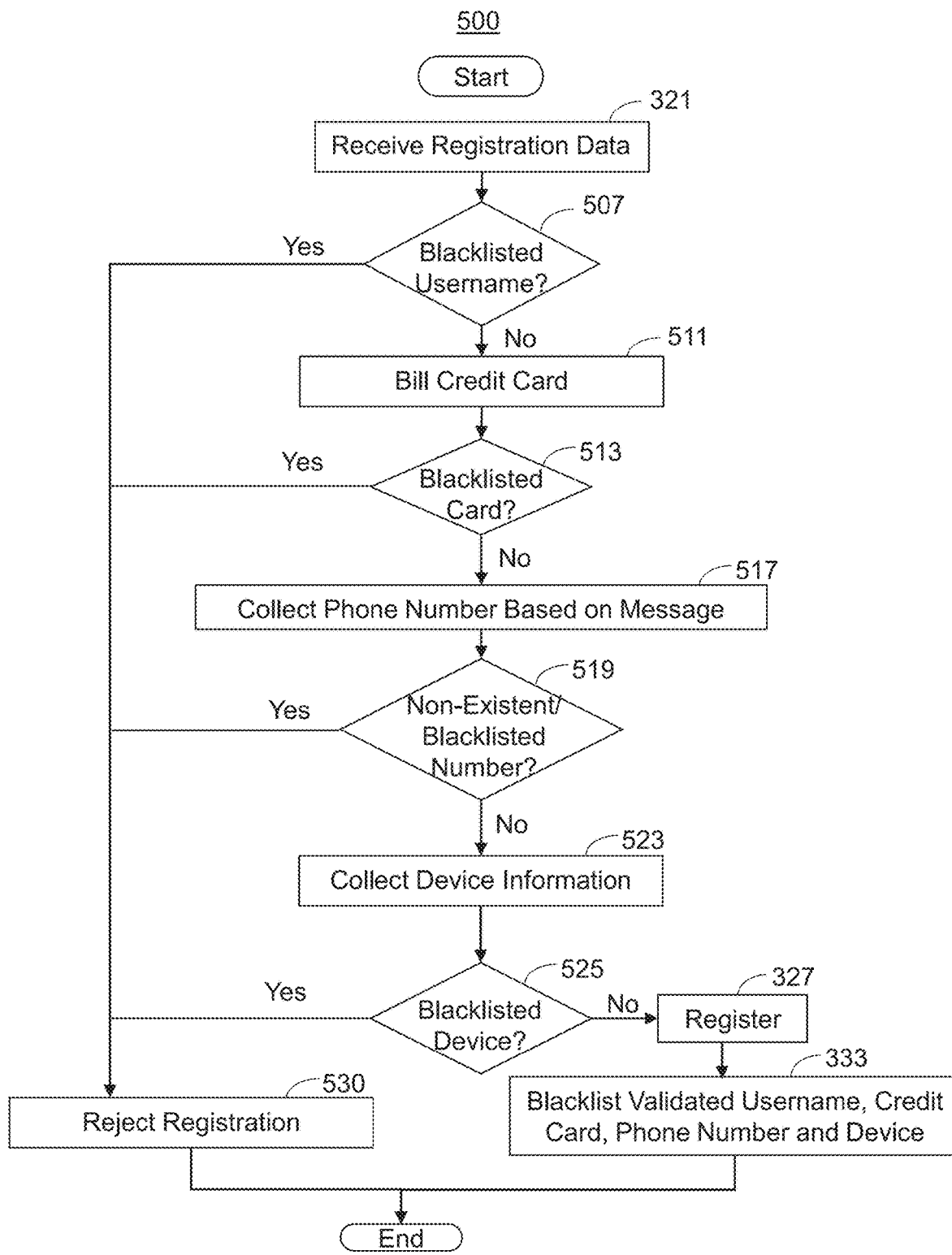
FIG. 5 is an example flowchart of a process for verifying user credentials using a second verification process consistent with disclosed embodiments.

FIG. 5 shows an example process 500 of registering user 140 via the second registration process. Process 500 includes some of the steps of the second registration process, but may not include all of the steps of the process, as some of the other steps are discussed in connection with FIG. 3. At step 321 server 110 may receive the second set of the credentials from user 140 and may collect various user-related data. Step 321 of process 500 is the same as step 321 of process 300. In an example embodiment, at step 321, registration data may include a username, user address, user phone, user device information, and the like.

At step 507, server 110 may verify that the username, supplied during the initial registration, is not blacklisted. For example, server 110 may compare the supplied username with blacklisted usernames stored in a database associated with server 110 (e.g., database 111). If the username is blacklisted (step 507, Yes), process 500 may proceed to step 530 and reject the second registration process. Alternatively, if the username is not blacklisted (step 507, No), process 500 may record the username in a database (e.g., database 111) and proceed to step 511.

At step 511, server 110 may bill a credit card of user 140 (the information about credit card may be collected either at step 321 or during the initial registration process as previously described). In an example, embodiments, billing the credit card number of user 140 by a small amount (e.g., a dollar) allows server 110 to obtain financial information related to the credit card (e.g., determining if the credit card number is valid, if the name, expiration date, and billing address of user 140 is valid). At step 513 server 110 may determine if the credit card number was not used (i.e., the credit card is not blacklisted) for previous registrations by comparing the number with credit card numbers stored in database 111 that were used for prior registrations of for prior registration attempts. If the credit card is not blacklisted (step 513, No), process 500 may record the credit card number in database 111 and proceed to step 517. Alternatively, if the credit card was blacklisted (step 513, Yes), process 500 may proceed to step 530 and reject the second registration process.

At step 517, server 110 may collect and validate a phone number provided by user 140. For example, when the phone number provided by user 140 is a mobile phone capable of receiving text messages, server 110 may send a text message containing a token (e.g., a alphanumerical text string, an image, an emoji, and the like) via a short message service (SMS) to the phone corresponding to the phone number provided by user 140. In an example embodiment, the mobile phone may be a secondary device of user 140. After receiving the SMS text message, user 140 may be prompted by server 110, via the second registration form, to enter the received token to verify the secondary device of the user. Alternatively, when the phone number provided by user 140 is a landline, server 110 may be configured to call user 140 at the phone number provided by user 140 and transmit a token (e.g., a spelled out alphanumerical word) using an audio signal. For the case when server 110 calls the landline of user 150, after receiving the phone call, user 140 may be prompted by server 110, via the second registration form, to enter the received token to verify the secondary device of the user.

In addition to determining if the phone number is authentic, at step 519 server 110 may determine if the phone number is authentic (i.e., it such phone number exists) and if the phone number was previously validated and used for prior registrations of for prior registration attempts (i.e., if the phone number is blacklisted) by comparing with information stored in database 111. If the phone number is incorrect (non-existent) or was previously blacklisted (step 519, Yes), process 500 may proceed to step 530 and reject the second registration. Alternatively, if the provided phone number is determined to be authentic and not blacklisted (step 519, No), process 500 may record the phone number in database 111 and proceed to step 523.

At step 523, server 110 may collect information about the primary device (e.g., device 153, as shown in FIG. 1) using any suitable approach discussed above. In an example embodiment, server 110 may request user 140 to install a browser plugin for collecting the information about device 153. Alternatively, user 140 may be requested to install a standalone software application on device 153 to collect the information. As discussed above the browser plugin or the standalone software application may collect the MAC address or DRM ID of device 153, parameters related to hardware of device 153, and the like. Additionally, or alternatively, server 110 may request user 140 to install a secondary application on the secondary device (e.g., device 152). The secondary application may collect information related to device 152 such as the MAC address of the device 152, parameters related to hardware of device 152 (e.g., processor information, computer memory information, information about operational system, or any other suitable information that may uniquely identify device 152. In some embodiments, the secondary application may also be configured to collect user related information stored in a memory of device 152 (e.g., user contact information, user contacts, etc.). At step 525, server 110 may determine if device 153 and/or device 152 were validated and used before for prior registrations of for prior registration attempts (i.e., if device 153 and/or device 152 are blacklisted). For example, server 110 may compare information received for device 152 and device 153 with information stored in database 111 related to devices used for prior registrations or for prior registration attempts. If devices 152 and/or 153 are not blacklisted (step 525, No), process 500 may proceed to step 327 and register the user. Alternatively, if device 152 or 153 is blacklisted (step 525, Yes), process 500 may proceed to step 530 and reject the second registration.

After completion of step 327, process 500 may proceed to step 333 and blacklist validated information received during the registration process. As described above, at step 333, the username, the credit card number, the phone number, and the information related to one or more user devices may be blacklisted. In some embodiments, process 500 may include additional steps. For example, process 500 may include steps of collecting information about a driver's license of the user, a social security number of the user, and the like. In some cases, process 500 may include steps of collecting user bank account information, information about user assets, and the like. Further, some of the steps of process 500, as shown in FIG. 5, may not be present. For example, process 500 may not collect credit card information but instead, collect tax-related information.

Figure 6:
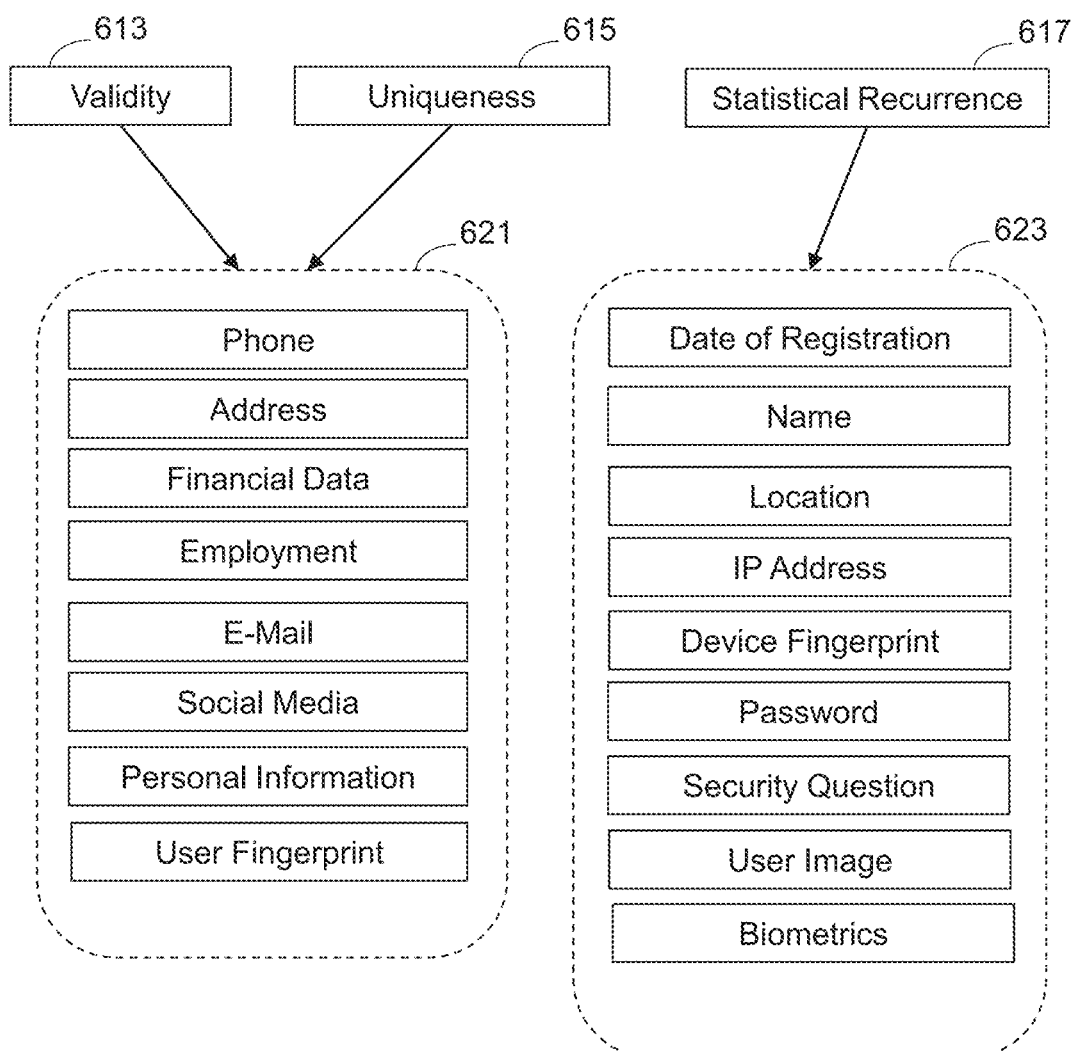
FIG. 6 is an example diagram describing types of user credentials used for various verification processes consistent with disclosed embodiments.

FIG. 6 shows example credentials for verifying user 140 for registration for the services (e.g., services 116, as shown in FIG. 1). The initial and the second verification process may include unique credentials 621 that may be used for a validity verification process 613, and uniqueness process 615. Additionally, nonunique credentials 623 may be used for a statistical recurrence process 617. While various credentials were described above, here, for completeness, the unique credentials for user 140 may include a phone number, an address and, for second registration, previous addresses of user 140, a financial data (e.g., a credit card data, a bank account data, a credit report, and the like), an employment data (e.g., occupation of the user, name of the employer, address of the employer, wages for user 140, tax information for user 140, benefits, and the like), an email of the user, information about social media (e.g., posts of the user on social media or blog posts), and personal information (e.g., user date of birth, user height, user weight, user eye color, user place of birth, user mother's maiden name, user's choice of security questions and related answers, address of user's parents, name of siblings, user's vehicle related information, plans for retirement, favorite travel destinations, hobbies, favorite activities, and the like). The listed credentials are only illustrative, and a variety of other credentials may be used. For example, server 110 may be configured to determine contacts of user 140 based on one or more social media accounts.

The nonunique credentials may include a date of registration for services 116, as shown in FIG. 1, a name of user 140, a location of the primary device of user 140, a location of the secondary device of user 140, a location obtained by analyzing an IP address of the primary and/or secondary device, and a device fingerprint (i.e., device unique information such as the MAC address, and the like, as described above) for the primary and/or secondary device. Also, the nonunique credentials may include a password and/or security questions. Further, the nonunique credentials may include user biometrics such as a voiceprint (i.e., a sample of a voice) of the user, a set of images of user 140, a video of user 140, a video or an image of surroundings of user 140, images of user 140 collected from the Internet and social media, click speed determined by server 110 when user 140 is interacting with the initial or second registration forms, a typing rate of user 140, a preference for typing or pasting, an order of answering various registration question (for cases when registration questions may be selected by user 140), type of questions selected by user 140 (for cases when user 140 is allowed to select a subset of questions from the various registration questions provided by server 110). In some cases, the user biometrics may include an image of an iris of user 140 (e.g., the image of the iris may be captured using the secondary device of user 140). Also, the user biometrics may include a fingerprint of user 140 (e.g., the fingerprint may be captured by the secondary device of user 140). Additionally, the user biometrics may include behavioral biometrics such as contact area of a finger of the user, a length of the finger, a pressure on screen from one or more fingers, a pressure on the screen from a screen stylus pen, angle to which device is held, as well as speed of various user actions (e.g., a click speed).

In addition to collecting credentials from user 140, server 110 may initiate some requests. For example, server 110 may request user 140 to add a social media account associated with services 116 to a list of friends of user 140. This may allow server 110 to obtain more information about user 140 and further interact with user 140 via social media posts, chats, and multimedia sharing. Further, server 110 may request access to a blog of user 140, request access to photos of user 140, and run a background check on user 140.

Figure 7:
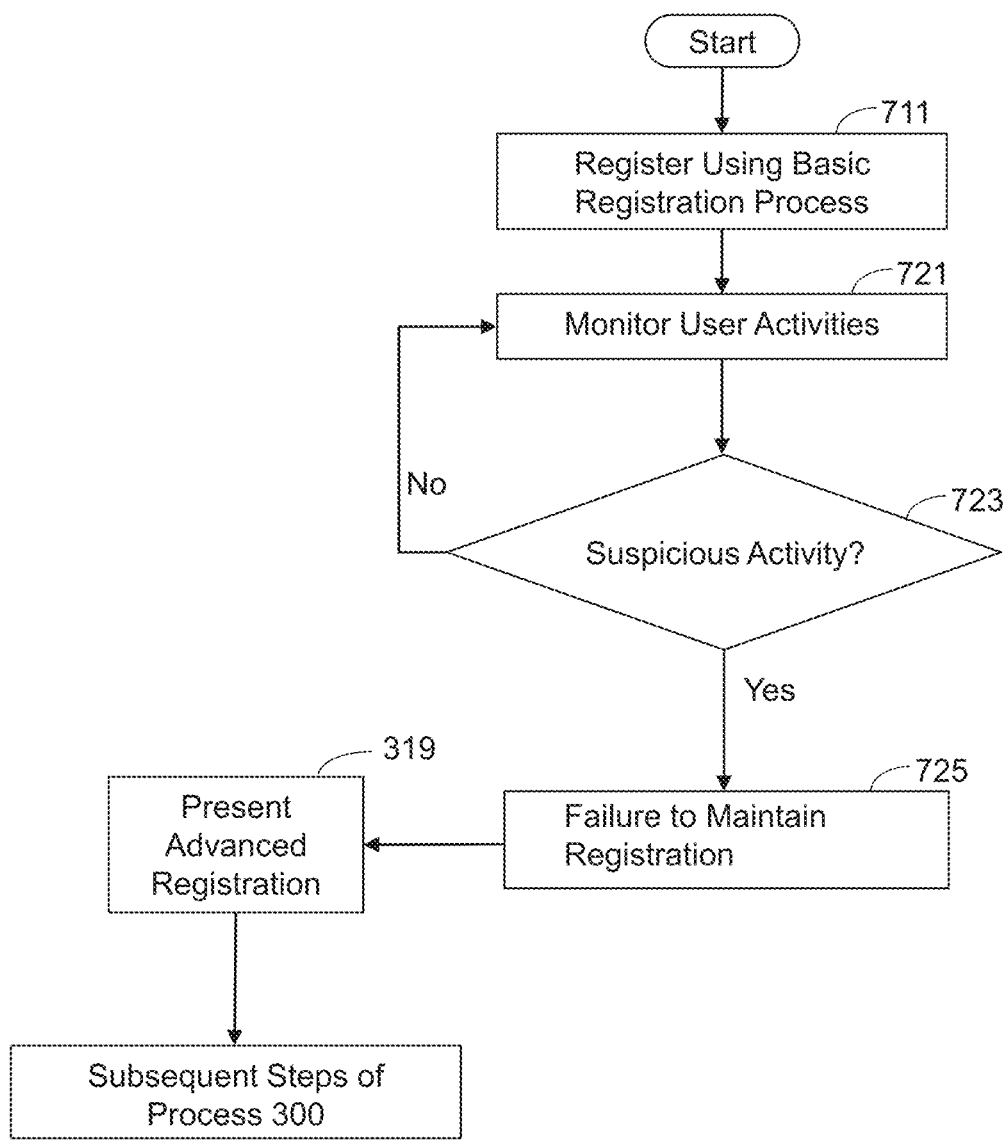
FIG. 7 is an example flowchart of a process for monitoring user activity as a part of a verification process consistent with disclosed embodiments.

FIG. 7 shows an example process 700 of suspending services for a user due to a fraudulent registration. The registration may be determined to be fraudulent based on user activities when using services provided by server 110 (e.g., services 116, as shown in FIG. 1). At step 711, user 140 may be allowed to be registered using only an initial simple registration process. For example, user 140 may register at step 711 using a social media account as shown, for example, in FIG. 2A. In some cases, user 140 may be required to install browser plugin 210, as shown in FIG. 2A, and in some cases, user 140 may be required to install a standalone application on the primary and/or the secondary device. Server 110 may then authorize the user to use services 116. As user 140 is using services 116, server 110 may be configured to monitor user activity at step 721 of process 700. For example, server 110 may monitor what products user 140 is buying, what video content is being consumed by user 140, what type of comments user 140 leaves about services 116, changes in profile information for user 140, as shown, for example, in FIG. 2C, the type of content distributed by user 140 using services 116, and the like. The activities of user 140 may be recorded in database 111 for further reference. A step 723, server 110 may check if user activities are suspicious. For example, server 110 may be configured to calculate a suspicion score related to user activities. The score may be evaluated using any suitable approaches. For example, if user activities are repeated (i.e., statistically similar to activities of previously registered users), the server may assign a first suspicion weight $s_1$, and if the user uploads files that have previously been associated with other accounts, the server may assign a second suspicion weight $s_2$. The total score may be calculated as $S=\Sigma s_i$. In some cases, the suspicion score related to the user activities may be calculated using a machine-learning method, such as neural networks, recurrent neural networks, convolutional neural networks, and the like.

As described above, server 110 may check if the activities are statistically similar to activities found for other previously registered users. The similarity of activities may be one of the factors for deciding whether or not to continue providing services 116 for the user, besides other factors related to the first set of credentials obtained during the initial verification process, which may include inconsistent credentials, or statistically recurrent credentials, as described above. If the activities are suspicious (e.g., if the suspicion score is above a predetermined threshold value) (step 723, Yes), process 700 may proceed to step 725 and determine that services 116 need to be suspended. After step 725, process 700 may proceed to step 319, which is the same as step 319 of process 300, as shown in FIG. 3. After step 319, server 110 may be configured to follow process 300, as shown in FIG. 3. If the activities are not similar (step 723, No), server 110 may proceed to step 721 and further monitor user activities.

Figure 8:
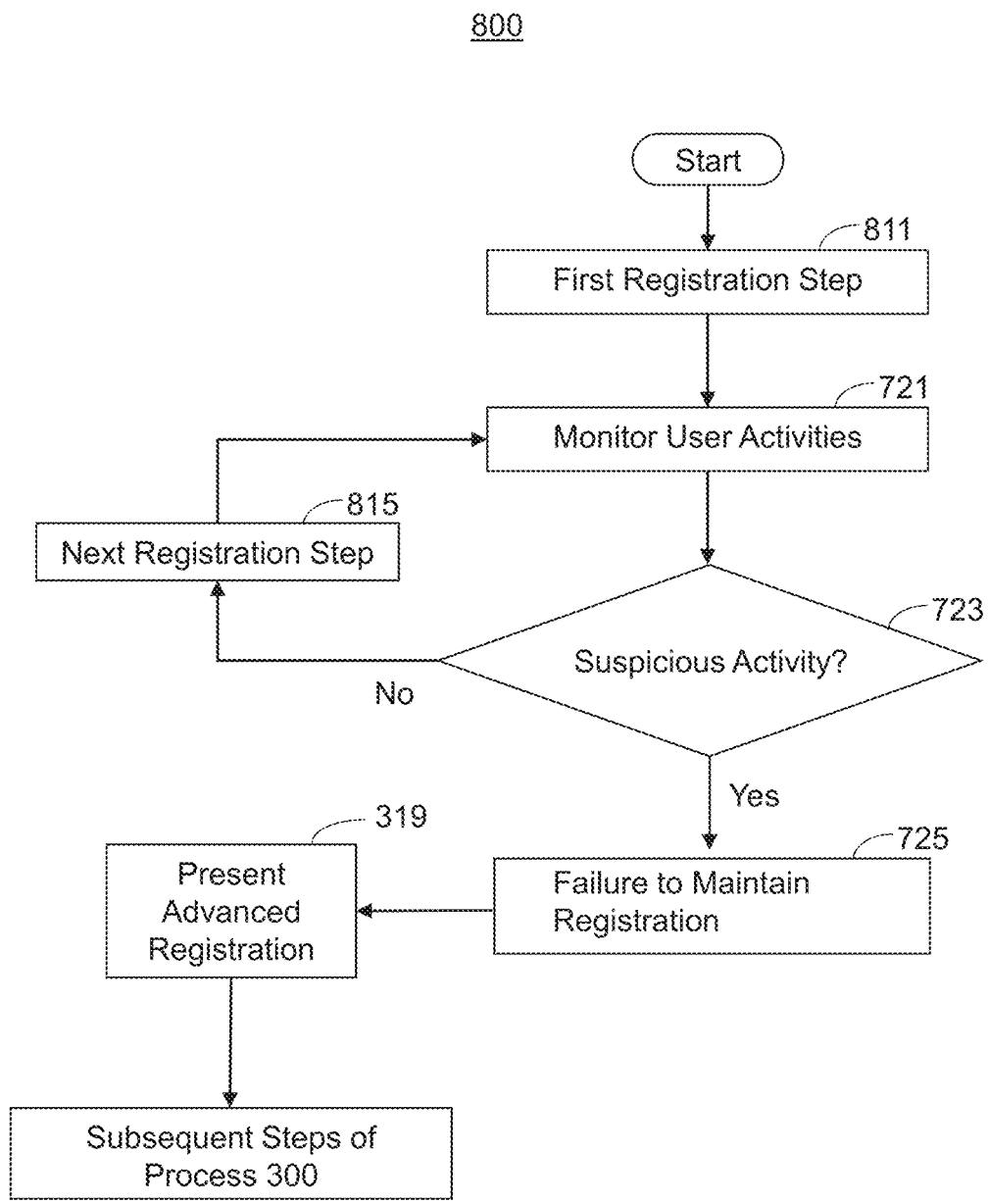
FIG. 8 is an example flowchart of a process for monitoring user activity and prompting a user for further registration steps as a part of a verification process consistent with disclosed embodiments.

FIG. 8 shows an example process 800 that may be a variation of process 700. At step 811, server 110 may provide a first step for the initial registration process. For example, server 110 may ask user 140 to provide only a few registration credentials (e.g., an email and a password), and may obtain other registrations credentials later. At step 721, server 110 may monitor the activity of user 140, and at step 723 may determine if user activities are suspicious. Steps 721 and 723, as well as steps 725 and 319 of process 800 may be the same as steps 721, 723, 725, and 319 of process 700. If the activities are not suspicious (step 723, No), server 110 may proceed to step 815 and request user 140 to enter one or more credentials in order to continue using services 116. In an example embodiment, user 140 may be prompted to enter the next set of credentials after using services 116 for a prescribed interval of time. For example, user 140 may be prompted to enter the next set of credentials every hour, every few hours, every day, every week, and the like. Alternatively, if the activities are suspicious (step 723, Yes), process 700 may proceed to step 725 and determine that services 116 need to be suspended. After step 725, process 700 may proceed to step 319 and then follow subsequent steps of process 300, as shown in FIG. 3.

As described above, system 100 for registering a user, as shown in FIG. 1, may include various devices, such as processors, memory devices, and various user devices (e.g., devices 150). For example, user devices 150 may include one or more computing devices configured to perform one or more operations consistent with disclosed embodiments. For example, user devices 150 may include a desktop computer, a laptop, a server, a mobile device (e.g., tablet, smartphone, etc.), a set-top box, a gaming device, a wearable computing device, or another type of computing device. User devices 150 may include one or more processors configured to execute software instructions stored in memory, such as memory included in user devices 150 to perform operations to implement the functions related to registering the user of a user device (e.g., device 153), authenticating the user, and communicating with server 110 to receive services administered by server 110. User devices 150 may be configured for wired and/or wireless communications and may include software that when executed by a processor, performs internet-related communication (e.g., TCP/IP) and content display processes. For instance, user devices 150 may execute browser software that generates and displays interfaces on a display device included in, or connected to, user devices 150. User devices 150 may execute one or more applications that allow user devices 150 to communicate with server 110 over network 130.

The disclosed embodiments are not limited to any particular configuration of user devices 150. For instance, a user device may be a mobile device that stores and executes an application to perform operations for requesting, and receiving the services administered by server 110 (e.g., receiving content from server 110). In certain embodiments, user devices 150 may be configured to execute software instructions relating to location services, such as GPS locations. For example, user devices 150 may be configured to determine a geographic location and provide location data and time stamp data corresponding to the location data to server 110.

As described above, server 110, as shown in FIG. 1, may include a computing system 112, and a database 111. Server 110 may include one or more computing systems that perform operations for providing services for a user. Server 110 may include databases (e.g., database 111) that include various content (e.g., videos, documents, presentations, graphs, images) available to user 140. Server 110 may also include processors that perform authentication functions of user devices 150, users of user devices 150, and/or resolve client identities based on client IDs and/or a secure token. In some embodiments, server 110 may include processing devices to resolve URLs. In some embodiments, server 110 may include multiple core processors to handle concurrently multiple operations and/or streams. For example, server 110 may include parallel processing units to concurrently handle requests of multiple user devices 150.

Database 111 may include one or more computing devices configured with appropriate software to perform operations for providing content to server 110. Database 111 may include, for example, Oracle™ database, Sybase™ database, or other relational databases or non-relational databases, such as Hadoop™ sequence files, HBase™, or Cassandra™. In an illustrative embodiment, database 111 may include computing components (e.g., database management system, database server, etc.) configured to receive and process requests for data stored in memory devices of the database and to provide data from the database.

Database 111 may be configured to collect and/or maintain the data associated with user accounts and user preferences. For example, database 111 may store information about user credentials. Database 111 may collect the data from a variety of sources, including, for instance, online resources.

Network system 130 may include any type of connections between various computing components. For example, network system 130 may facilitate the exchange of information via network connections that may include Internet connections, Local Area Network connections, near field communication (NFC), or other suitable connection(s) that enable the sending and receiving of information between the components of system 130. In some embodiments, one or more components of system 130 may communicate directly through a dedicated communication link(s).

As described above, server 110 may transmit information to a user device (e.g., device 152, as shown in FIG. 1). Server 110 may perform functions such as routing content, resolving domain systems, handling user requests, and creating sessions with user devices 150 for service delivery. Further, server 110 may be configured to provide authentication credentials to user devices 150. For example, server 110 may provide a secure cookie, or an equivalent technique for authentication, at a session startup time.

In some embodiments, processors of computing system 112 (e.g., processors 115, as shown in FIG. 1) may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, processors 115 may be a plurality of devices coupled and configured to perform functions consistent with the disclosure. For example, processors 115 may include a plurality of co-processors, each configured to run specific operations such as floating-point arithmetic, graphics, signal processing, string processing, cryptography or I/O interfacing. In some embodiments, processors may include a field-programmable gate array (FPGA), central processing units (CPUs), graphical processing units (GPUs), and the like.

It is to be understood that the configuration and the functionality of components of system 100 have been defined herein for the convenience of the description. Alternative configurations can be defined as long as the specified functions and relationships thereof are appropriately performed. Alternatives (including equivalents, extensions, variations, deviations, etc., of those described herein) will be apparent. Such alternatives fall within the scope and spirit of the disclosed embodiments.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application; such examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents which may be resorted to fall within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A user registration method comprising:
prompting a user to provide a first set of credentials;
receiving the first set of credentials;
using an initial verification process including at least one of a validity, a uniqueness, a suspicious contextual detection, or a statistical recurrence verification process, to verify the first set of credentials based on stored data;
based on a negative result of the initial verification process:
prompting the user to provide a second set of credentials, wherein the first and second sets of credentials are both associated with the user,
receiving the second set of credentials; and
using a second strong validation process to validate the second set of credentials based on the stored data;
performing at least one of:
registering the user for a service based on at least one of a positive result of the initial verification process or a positive result of the second strong validation process; or
refusing to register the user for the service based on at least a negative result of the initial verification process and the negative result of the second strong validation process;
blacklisting the verified second set of credentials upon registering the user;
suspending the service when an activity of the user is statistically similar to activities of previously registered users; and
resuming the service, based on a positive verification of the second set of credentials.

2. The method of claim 1, further comprising rejecting registration of the user for the service after completion of the initial verification process, when the user enters at least one blacklisted credential from the first set of credentials.

3. The method of claim 1, wherein, during the second strong validation process, the user is requested to authorize collecting information about a primary device used for the registration of the user, and wherein the information about the primary device is collected.

4. The method of claim 1, wherein the initial verification process includes operations comprising:
collecting an Internet provider address of a primary device; and
estimating a location of the primary device based on the Internet provider address.

5. The method of claim 4, wherein the second strong validation process includes operations comprising:
requesting the user to authorize transmitting a location of a secondary device via an application for the secondary device;
transmitting the location of the secondary device; and
comparing the location of the secondary device and the location of the primary device.

6. The method of claim 1, wherein during the second strong validation process, the user is requested to provide information associated with a credit card, wherein the credit card information is collected, and wherein the credit card is charged a small fee to verify the credit card.

7. The method of claim 1, wherein the second strong validation process includes operations comprising:

requesting the user to provide a phone number for a phone;
providing a code via the phone to the user; and
validating the phone by receiving the code from the user, the code being a credential from the second set of credentials.

8. The method of claim 1, further including collecting and evaluating behavior biometrics of the user.

9. The method of claim 8, wherein the evaluating biometrics of the user includes at least one of measuring a click speed, or determining whether the first set of credentials was input via a typing or a pasting process.

10. The method of claim 1, wherein during the second strong validation process, the user is requested to verify a social media account of the user by accepting a friendship invitation.

11. The method of claim 10, wherein the social media account includes one of a Twitter account, a Facebook account, a Google account, a YouTube account, a Vimeo account, a LinkedIn account, a VK account, a WeChat account, or a Sina Weibo account.

12. The method of claim 1, wherein the second strong validation process includes operations comprising:
requesting the user to provide a reference user, wherein the reference user is a registered user;
sending a verification to the reference user; and
receiving a confirmation from the reference user.

13. The method of claim 1, wherein:
the validity verification process of the initial verification process includes operations comprising determining whether registration information is valid,
the uniqueness verification process of the initial verification process includes operations comprising:
determining whether unique registration parameters are repeated by comparing the first set of credentials with first sets of credentials related to registrations of other users; and
determining whether the unique registration parameters are repeated by comparing the first set of credentials with first sets of credentials related to previous unsuccessful registrations;
the suspicious contextual detection process of the initial verification process includes operations comprising determining a suspicious score; and
the statistical recurrence verification process of the initial verification process includes operations comprising:
determining whether nonunique registration parameters are statistically repeated by comparing the first set of credentials with the first sets of credentials related to registrations of other users.

14. The method of claim 13, wherein the suspicious content detection process further includes operations comprising:
determining a presence of suspicious issues; and
determining whether the suspicious issues are correlated.

15. The method of claim 14, wherein the presence of suspicious issues is determined when at least one unique credential from the first set of credentials matches a unique credential entered during at least one of a previous registration or a previous registration attempt.

16. The method of claim 14, wherein the presence of suspicious issues is determined when:
at least one unique credential from the first set of credentials matches a unique credential entered during at least one of a previous registration or a previous registration attempt; and behavioral biometrics evaluated for the user entering the first or the second set of credentials matches behavioral biometrics determined during at least one of a previous registration or a previous registration attempt.

17. The method of claim 1, wherein registering the user is conducted using a primary device via a browser having a browser plugin, the browser plugin configured to collect information about the primary device.

18. The method of claim 1, wherein the second strong validation process includes operations comprising:
collecting information about the user using at least one outside source;
formulating a question for the user;
asking the user the question; and
determining an authenticity of the user based on an answered question.

19. The method of claim 18, wherein the at least one outside source comprises one of social media posts for the user, posts related to the user, social media links to the user, credit information for the user, and background check for the user.

20. A system for registering a user via a primary device including a server, configured to execute instructions to perform operations comprising:
providing the user with an initial registration process, wherein the initial registration process requires the user to enter a first set of credentials, the first set of credentials including a username;
evaluating statistical biometrics data of the user when the user is entering the first set of credentials during the initial registration process;
determining whether suspicious issues are present;
determining an initial qualification for registration based on:
verification of the first set of credentials based on a stored data; and
an absence of the suspicious issues presented in the statistical biometrics data;
performing at least one of:
registering the user for a service based on a positive initial qualification;
providing the user with a second registration process, based on a negative initial qualification, wherein the second registration process includes operations comprising:
collecting information about the primary device;
requesting the user to authorize a charge for a credit card;
sending to a secondary device a secure token;
requesting the user to enter the secure token via the primary device; and
charging the credit card;
determining a second qualification by validating at least one of the credit card, the primary device information, or secondary device information associated with the user;
performing at least one of:
registering the user for the service based on a positive second qualification;
refusing to register the user for the service based on a negative initial qualification and the negative second qualification; and
blacklisting the validated data record upon registering the user.

21. The system of claim 20, wherein the operations further comprise rejecting registration of the user for the service after completion of the initial qualification process, when the user enters at least one blacklisted credential from the first set of credentials.

22. A user registration method comprising:
    prompting a user to provide a first set of credentials;
    receiving the first set of credentials;
    providing the user with an initial verification process, using at least one of a validity, a unique replication, a suspicious contextual detection, or a statistical replication verification process to verify the first set of credentials based on stored data;
    registering the user for a service, based a positive result of the initial verification process;
    monitoring a user activity while performing the service for the user;
    monitoring one or more associated user devices used to facilitate the user activity; and
    suspending the service when the activity of the user is statistically similar to activities of previously registered users;
    when the service is suspended:
        prompting the user to provide a second set of credentials, wherein the first and second sets of credentials are both associated with the user, the second set of credentials has at least one credential that is different from every credential from the first set of credentials, the second set of credentials including at least one of a credit card number, a phone number, a username, or a device information associated with the user;
        receiving the second set of credentials; and
        using a second strong validation process to verify the second set of credentials based on the stored data;
        resuming the service, based on a positive verification of the second set of credentials; and
    blacklisting any verified credentials from the first or the second set of credentials.

* * * * *